United States Patent
Kishi

(10) Patent No.: US 8,762,765 B2
(45) Date of Patent: Jun. 24, 2014

(54) ELECTRONIC APPARATUS, CLOCK APPARATUS, AND CLOCK CONTROL APPARATUS

(75) Inventor: Masakazu Kishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 606 days.

(21) Appl. No.: 12/585,294

(22) Filed: Sep. 10, 2009

(65) Prior Publication Data

US 2010/0002818 A1    Jan. 7, 2010

Related U.S. Application Data

(63) Continuation of application No. PCT/JP2007/055276, filed on Mar. 15, 2007.

(51) Int. Cl.
*G06F 1/04* (2006.01)
*G06F 1/08* (2006.01)
*G06F 1/32* (2006.01)

(52) U.S. Cl.
USPC ............... 713/501; 713/1; 713/300; 713/310; 713/320; 713/322; 370/330

(58) Field of Classification Search
CPC ... G06F 1/324; G06F 1/3203; G06F 11/3051; H04L 12/2861; H04L 12/2898; H04L 2209/80; H04L 27/0014
USPC ............ 713/500, 501, 600, 1, 300, 310, 320, 713/322; 375/136, 344; 370/330
See application file for complete search history.

(56) References Cited

U.S. PATENT DOCUMENTS

| 7,486,754 | B2 | 2/2009 | Uchida | |
|---|---|---|---|---|
| 2001/0028782 | A1* | 10/2001 | Ohno et al. | 386/46 |
| 2003/0198307 | A1* | 10/2003 | Neill et al. | 375/346 |
| 2006/0153325 | A1 | 7/2006 | Uchida | |

FOREIGN PATENT DOCUMENTS

| CN | 1804752 A | 7/2006 |
|---|---|---|
| JP | 9-130373 | 5/1997 |
| JP | 11-055118 | 2/1999 |
| JP | 2000-341119 | 12/2000 |
| JP | 2001-320275 | 11/2001 |
| JP | 2004-32429 | 1/2004 |
| JP | 2004-201119 | 7/2004 |
| JP | 2005-276179 | 10/2005 |

OTHER PUBLICATIONS

Chinese Office Action issued Sep. 22, 2011 in corresponding Chinese Patent Application 200780052139.9.

(Continued)

*Primary Examiner* — Michael J Brown
(74) *Attorney, Agent, or Firm* — Staas & Halsey LLP

(57) ABSTRACT

An electronic apparatus input and/or output a signal from and/or an external apparatus. The electronic apparatus includes: a clock section in which a frequency is set and which gives a clock signal having the set frequency; an input-output section which inputs and/or outputs the signal according to the clock signal given from the clock section; a frequency detecting section which detects a frequency of a signal given from the external apparatus; and a frequency setting section which determines the frequency of the clock signal based on the frequency detected by the frequency detecting section, and sets the frequency in the clock section. Since the frequency of the clock signal is automatically set based on the frequency given from the external apparatus, it is possible to diminish a cumbersome maintenance work or reduce the cost.

7 Claims, 5 Drawing Sheets

(56) References Cited

OTHER PUBLICATIONS

International Search Report for PCT/JP2007/055276, mailed Jun. 5, 2007.

English Translation of the International Preliminary Report on Patentability mailed Oct. 8, 2009 in corresponding International Patent Application PCT/JP2007/055276.
Chinese Office Action mailed Jul. 10, 2013 in corresponding Chinese Application No. 200780052139.9.

* cited by examiner

ELECTRONIC APPARATUS, CLOCK APPARATUS, AND CLOCK CONTROL APPARATUS

CROSS-REFERENCE TO RELATED APPLICATION

This is a continuation application of PCT/JP2007/55276, filed on Mar. 15, 2007.

TECHNICAL FIELD

The present invention relates to an electronic apparatus which inputs and/or outputs a signal to and/or from an external apparatus, a clock apparatus which supplies a clock signal to the electronic apparatus, and a clock control apparatus which controls the clock signal supplied to the electronic apparatus.

BACKGROUND ART

Electronic apparatuses such as a mobile telephone or a personal computer are composed by combining many electronic parts such as various integrated circuits, a resistor, and a capacitor. Each of electronic apparatuses mounts thereon an oscillator having a clock frequency according to its specifications. Each of plural housed electronic components is driven according to a clock signal, thereby achieving operational characteristics complying with the specifications.

In a communication apparatus which performs communications with an external apparatus, data carrier frequencies are different according to a country in which the device is used or the type of external apparatus to be connected. Therefore, a preferred clock frequency may depend upon a network condition on a client side even in the case of the communication apparatuses of the same type. In view of this, there are prepared plural versions mounting plural oscillators having clock frequencies different from each other in one type of communication apparatus; or plural oscillators having clock frequencies different from each other are mounted in one communication apparatus, and then, only an oscillator having a clock frequency suitable for a network condition is set to be effectively available on a client side, thus raising a problem of unnecessary cost.

In regard to this, a programmable oscillator whose oscillation frequency may be set by a user has been used in recent years (see, for example, Japanese Laid-open Patent Publication Nos. 2005-276179, 2001-320275, 11-55118, and 2000-341119). It is conceivable to mount such a programmable oscillator on a communication apparatus. The programmable oscillator is mounted on the communication apparatus, and a clock frequency according to a network condition on a client side is set, so that it is possible to save time and effort in preparing communication apparatuses of plural versions or mounting plural oscillators inside of one communication apparatus, thus reducing fabrication cost.

However, in delivering the communication apparatus to a client, it is necessary for an engineer of a manufacturer of the communication apparatus to visit to the client, to determine a clock frequency in consideration of a network condition or the like, and to set the clock frequency for the programmable oscillator. In addition, every time the use environment of the communication apparatus is changed, an engineer needs to determine and reset the clock frequency, thereby raising a problem of cumbersome maintenance.

Such a problem is not limited to only the communication apparatus but generally arises in the field of the electronic apparatus which inputs and/or outputs a signal to and/or from an external apparatus.

In view of the foregoing, an object of the present invention is to provide an electronic apparatus, a clock apparatus, and a clock control apparatus in which a clock frequency may be readily set.

DISCLOSURE OF THE INVENTION

According to the present invention, an electronic apparatus to which an external apparatus is connected and which performs at least one of inputting and outputting a signal to and from the external apparatus, includes:

a clock section in which a frequency is set and which gives a clock signal having the set frequency;

an input-output section which performs an input-output operation including at least one of inputting and outputting the signal according to the clock signal given from the clock section;

a frequency detecting section which detects a frequency of a signal given from the external apparatus; and a frequency setting section which determines the frequency of the clock signal based on the frequency detected by the frequency detecting section, and sets the frequency in the clock section.

In the electronic apparatus according to the present invention, the frequency of the signal given from the external apparatus is detected, and, the frequency of the clock signal is automatically determined based on the detected frequency to be set in the clock section. As a consequence, it is possible to save time and effort that an engineer visits to a client to set the frequency of the clock signal when delivering the electronic apparatus, or that the clock signal is manually adjusted again when the electronic apparatus is used in a different country or the external apparatus to be connected is changed, thus diminishing a cumbersome maintenance work or reducing the cost.

In the electronic apparatus according to the invention, it is preferable that the frequency detecting section receives a reference clock signal given from the clock section in which a predetermined reference frequency is set, and operates according to the reference clock signal.

Before the frequency of the clock signal is determined, the reference clock signal is given, so that the frequency detecting section may be securely driven.

In addition, in the electronic apparatus according to the invention, it is preferable that the frequency setting section finds, out of plural predetermined frequencies, a corresponding frequency which is an integral multiple or an integral submultiple of the frequency detected by the frequency detecting section, and then, determines the corresponding frequency as the frequency of the clock signal to set the frequency in the clock section.

According to the preferred electronic apparatus, a corresponding frequency being an integral multiple or an integral submultiple of the frequency of the signal to be input into or output from the external apparatus is determined as the frequency of the clock signal, highly reliable communications in which communication errors are reduced may be performed with the external apparatus.

In addition, in the electronic apparatus according to the invention, it is preferable that the electronic apparatus according to claim 1 further includes a frequency notifying section of which a frequency is notified via a communication line, wherein the frequency setting section searches, out of plural predetermined frequencies, the corresponding frequency which is an integral multiple or an integral submultiple of the frequency detected by the frequency detecting section, and if the frequency setting section finds the corresponding frequency, the frequency setting section determines the corresponding frequency as the frequency of the clock signal to set the frequency in the clock section, and if the frequency setting section does not find the corresponding frequency, the frequency setting section sets, in the clock section, the frequency notified in the frequency notifying section.

Firstly, the corresponding frequency is searched for based on the frequency detected by the frequency detecting section. When the corresponding frequency is not found, the frequency notified via the communication line is determined as the frequency of the clock signal, so that the frequency of the clock signal nay be efficiently set.

In addition, in the electronic apparatus according to the invention, it is preferable that the clock section includes:

a storing section which stores plural frequencies;
a designating section in which one of the plural frequencies stored in the storing section is designated; and an oscillating section which gives a clock signal having the frequency designated in the designating section.

The clock frequency of the communication apparatus or the like is generally limited to some typical frequencies associated with carrier frequency of the signal. The candidates of the typical frequencies are stored in advance, so that the clock signal may be oscillated at an adequate frequency.

In addition, in the electronic apparatus according to the invention, it is preferable that the clock section includes:

a storing section which stores plural frequencies and rewritably stores one or more frequencies other than the plural frequencies;
a designating section which one of the frequencies stored in the storing section is designated; and
an oscillating section which gives a clock signal having the frequency designated in the designating section, and
the electronic apparatus further includes a frequency notifying-storing section of which a frequency is notified via a communication line and which stores the notified frequency in the storing section.

The frequency notified via the communication line is stored in the storing section in the clock section, so that the frequency of the clock signal given from the oscillator may be remotely operated.

In addition, in the electronic apparatus according to the invention, it is preferable that the electronic apparatus further includes a determining section which evaluates the quality of the input-output operation performed by the input-output section according to the clock signal given from the clock section, so as to determine the propriety of the frequency set in the clock section.

It is determined whether or not the frequency set in the clock section is suitable. Then, the frequency determined as being suitable is used as the frequency of the clock signal, thus suppressing the generation of an inconvenience such as a communication error, so as to accurately input and/or output a signal to and/or from the external apparatus.

In addition, in the electronic apparatus according to the invention, it is preferable that the electronic apparatus according to claim 1 further includes a determining section which evaluates, every time the frequency setting section sets the frequency in the clock section, the quality of the input-output operation performed by the input-output section according to a clock signal given from the clock section, and determines the propriety of the frequency set in the clock section, wherein the frequency setting section finds, out of plural predetermined frequencies, a corresponding frequency which is an integral multiple or an integral submultiple of the frequency detected by the frequency detecting section, and determines the corresponding frequency as the frequency of the clock signal to set the frequency in the clock section; and if the frequency setting section finds plural the corresponding frequencies, the frequency setting section sets the plural the corresponding frequencies in the clock section one by one sequentially in a predetermined priority, and determines as a frequency of the clock signal the corresponding frequency which is determined to be appropriate in the determining section.

When plural corresponding frequencies are found, they are set in the clock section one by one sequentially in accordance with the priority. At a time when the corresponding frequency is determined to be appropriate, the corresponding frequency is determined as a frequency of the clock signal, so that a processing speed until the frequency of the clock signal is set may be increased.

Further, according to the invention, a clock apparatus that supplies a clock signal to an electronic apparatus to which an external apparatus is connected, and which performs at least one of inputting and outputting a signal to and from the external apparatus, includes:

a clock section in which a frequency is set and gives a clock signal having the set frequency;
a frequency detecting section which detects a frequency of the signal given from the external apparatus; and
a frequency setting section which determines the frequency of the clock signal based on the frequency detected by the frequency detecting section, and sets the frequency in the clock section.

In the clock apparatus according to the present invention, the frequency of the signal given from the external apparatus is detected, and the frequency of the clock signal is automatically determined based on the detected frequency.

Here, with respect to the clock apparatus, only the basic mode thereof is explained. However, this is only for avoiding duplication. The clock apparatus according to the present invention includes not only the basic mode but also various modes corresponding to the modes of the electronic apparatus.

Furthermore, according to the invention, a clock control apparatus that controls a clock signal to be supplied to an electronic apparatus to which an external apparatus is connected, and which performs at least one of inputting and outputting a signal to and from the external apparatus, includes:

a frequency detecting section which detects a frequency of the signal given from the external apparatus; and
a frequency setting section which determines the frequency of the clock signal based on the frequency detected by the frequency detecting section, and sets the determined frequency for a clock which supplies a clock signal of the set frequency to the electronic apparatus.

According to the clock control apparatus of the present invention, the frequency of the clock signal given from the clock may be automatically set based on the frequency of the signal given from the external apparatus.

Here, also with respect to the clock control apparatus, only the basic mode is explained. However, this is only for avoiding duplication. The clock control apparatus according to the present invention includes not only the basic mode but also various modes corresponding to the modes of the electronic apparatus.

As described above, according to the present invention, it is possible to provide the electronic apparatus, the clock apparatus, and the clock control apparatus in which a clock frequency may be readily set.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BEST MODE FOR CARRYING OUT THE INVENTION

Best modes according to the present invention will be described below with reference to the drawings.

Figure 1:
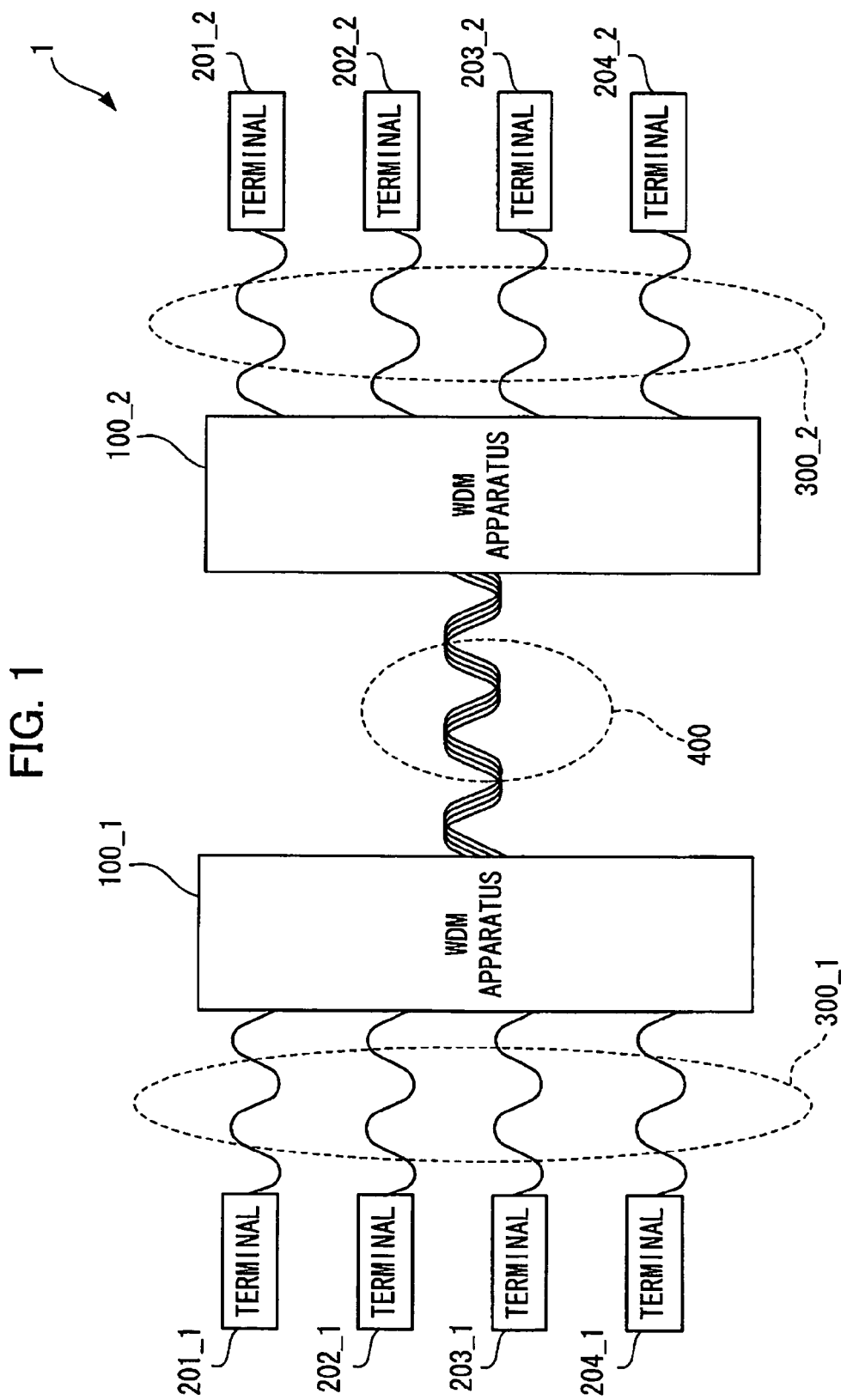
FIG. 1 is a schematic block diagram of a communication system to which an embodiment according to the present invention is applied.

FIG. 1 is a schematic block diagram of a communication system to which an embodiment according to the present invention is applied.

A communication system 1 illustrated in FIG. 1 includes two WDM (wavelength division multiplexing) apparatuses 100_1 and 100_2 connected to each other via an optical fiber line 400, plural terminals 201_1, 202_1, 203_1, and 204_1 connected to the left WDM apparatus 100_1 in FIG. 1 via a client line 300_1, and plural terminals 201_2, 202_2, 203_2, and 204_2 connected to the right WDM apparatus 100_2 in FIG. 1 via a client line 300_2. In actuality, numerous terminals are connected to the WDM apparatus, and further, numerous WDM apparatuses, other communication apparatuses, the Internet network, and the like are connected to each other, although only members required for description of the present invention are illustrated in FIG. 1 for the sake of easy illustration of the drawing.

The WDM apparatuses 100_1 and 100_2 apply the characteristics that "lights having wavelengths that are different with each other do not interfere with each other" and convert plural signals to be transmitted to or to be received from the terminals 201_1, 202_1, 203_1, 204_1, 201_2, 202_2, 203_2, and 204_2 into optical signals having wavelengths different from one another, multiplex those plural optical signals to be loaded to perform communications, and then, allow them to communicate on a single optical fiber line 400. Each of the two WDM apparatuses 100_1 and 100_2 corresponds to the electronic apparatus in each of the embodiments according to the present invention. In addition, the terminals 201_1, 202_1, 203_1, 204_1, 201_2, 202_2, 203_2, and 204_2 correspond to an example of the external apparatus according to the present invention.

Moreover, the client lines 300_1 and 300_2 connect the WDM apparatuses 100_1 and 100_2 to the terminals 201_1, 202_1, 203_1, and 204_1 and 201_2, 202_2, 203_2, and 204_2, respectively, and may be wireless lines in addition to wire lines such as an optical fiber line or a coaxial cable line. The optical fiber line 400 and the client lines 300_1 and 300_2 correspond to an example of the communication line according to the present invention.

Here, the two WDM apparatuses 100_1 and 100_2 basically have the same configuration, and therefore, explanation will be representatively made below on the left WDM apparatus 100_1.

Figure 2:
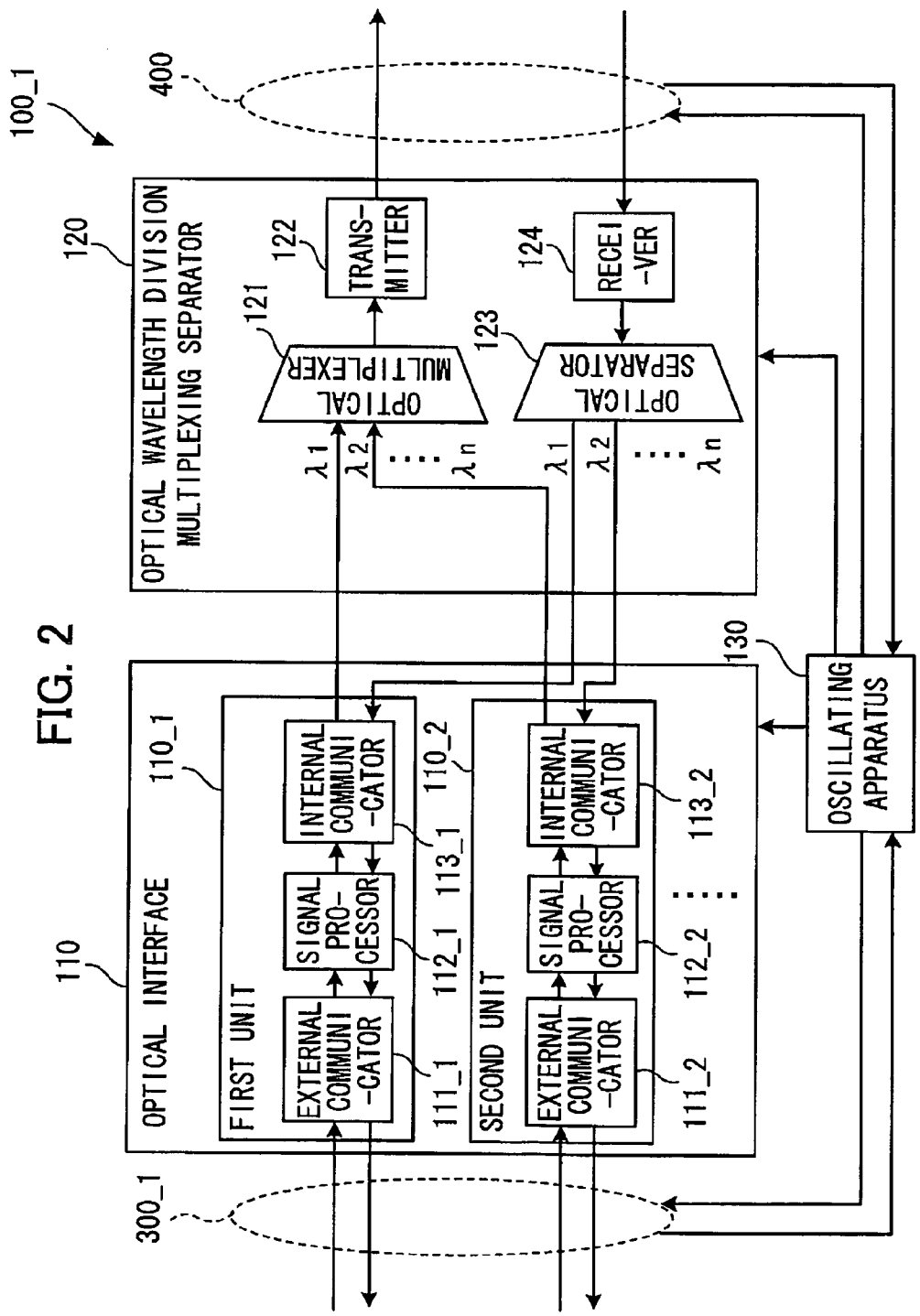
FIG. 2 is a functional block diagram of the WDM apparatus.

FIG. 2 is a functional block diagram of the WDM apparatus 100_1.

The WDM apparatus 100_1 includes an optical interface 110 which communicates with the terminal via the client line 300_1, an optical wavelength division multiplexing separator 120 which communicates with the other WDM apparatus via the optical fiber line 400, and an oscillating apparatus 130 which oscillates a clock signal.

The optical interface 110 includes plural communication units 110_1, 110_2, . . . respectively corresponding to the plural terminals connected to the WDM apparatus 100_1. The communication units 110_1, 110_2, . . . respectively include external communicators 111_1, 111_2, . . . which communicate with the terminals via the client lines 300_1, internal communicators 113_1, 113_2, . . . which optically communicates with the optical wavelength division multiplexing separator 120, and signal processors 112_1, 112_2, . . . for subjecting signals transmitted from the external communicators 111_1, 111_2, . . . and the internal communicators 113_1, 113_2, . . . to various signal processes.

On the other hand, the optical wavelength division multiplexing separator 120 includes an optical multiplexer 121 which multiplexes plural optical signals having different wavelengths, a transmitter 122 which transmits the optical signal multiplexed by the optical multiplexer 121 to the other WDM apparatus via the optical fiber line 400, a receiver 124 which receives the optical signal transmitted via the optical fiber line 400, and an optical separator 123 which separates the multiplexed optical signal for each of the wavelengths. The external communicators 111_1, 111_2, . . . , the transmitter 122, and the receiver 124 correspond to an example of the input-output section according to the present invention.

Before communications, a clock frequency is set in the oscillating apparatus 130, and a clock signal having the set clock frequency is, oscillated. Various components in the WDM apparatus 100_1 operate according to the clock signal, and thus, at least one of an input and an output timings of signals is matched. Setting the clock frequency will be explained in detail later.

When data is transmitted from the terminals 201_1, 202_1, . . . to the external apparatus, signals transmitted from the terminals 201_1, 202_1, . . . are input into the external communicators 111_1, 111_2, . . . corresponding to the terminals 201_1, 202_1, . . . , respectively, via the client line 300_1. Here, for example, in a case where the client line 300_1 for the terminal is an optical fiber line, a signal to be input from the terminal into the external communicator is an optical signal, and in a case where the client line 300_1 for the terminal is a wireless line, a coaxial cable line, or the like, a signal to be input from the terminal into the external communicator is an electric signal. The signals input into the external communicators 111_1, 111_2, . . . are transmitted to the signal processors 112_1, 112_2, . . . , respectively.

The signal processors 112_1, 112_2, . . . convert the signals transmitted from the external communicators 111_1, 111_2, . . . into optical signals having wavelengths λ1, λ2, . . . assigned to the terminals 201_1, 201_2, . . . , and further, add headers or error bits to the converted optical signals (i.e., digital wrapping). The digitally wrapped optical signals are transmitted to the optical multiplexer 121 through the internal communicators 113_1, 113_2, . . . .

The plural optical signals having the wavelengths λ1, λ2, . . . different from each other are transmitted from the communication units 110_1, 110_2, . . . to the optical multiplexer 121. The optical multiplexer 121 multiplexes the plural of transmitted optical signals, and then, transmits the multiplexed optical signal to the transmitter 122.

In the transmitter 122, the multiplexed optical signal is amplified, and the amplified multiplexed optical signal is transmitted to the other WDM apparatus via the optical fiber line 400. The multiplexed optical signal is separated for each of the wavelengths in the WDM apparatus, and the separated signals are transmitted to the external apparatuses, respectively.

In this manner, the signals are transmitted to the external apparatuses.

In addition, the signals transmitted from the external apparatuses are converted into the optical signals having wavelengths different from each other by the other WDM apparatus, to be multiplexed, and the multiplexed optical signal is transmitted to the WDM apparatus 100_1.

The multiplexed optical signal transmitted to the WDM apparatus 100_1 is received by the receiver 124 illustrated in FIG. 2, and then transmitted to the optical separator 123.

In the optical separator 123, after the multiplexed optical signal is amplified, and separated for each of the wavelengths λ1, λ2, . . . , so that the separated optical signals are transmitted to the communication units 110_1, 110_2, respectively.

The optical signals transmitted to the communication units 110_1, 110_2, . . . , respectively, are received by the internal communicators 113_1, 113_2, . . . , respectively, to be then transmitted to the signal processors 112_1, 112_2, respectively. In the signal processors 112_1, 112_2, . . . , the optical signals are converted into signals in a form suitable for the client line 300_1, and are respectively transmitted to the external communicators 111_1, 111_2, . . . , after being subjected to various signal processes such as error correction.

In the external communicators 111_1, 111_2, . . . , the transmitted signals are transmitted to the terminals 201_1, 202_1, . . . , respectively, via the client line 300_1.

As described above, the terminals 201_1, 202_1, illustrated on the left in FIG. 1 receive the signals, respectively.

The various components included in the WDM apparatus 100_1 illustrated in FIG. 2 perform the processing according to the clock signal given from the oscillating apparatus 130. Hereinafter, the oscillating apparatus 130 will be explained in detail.

Figure 3:
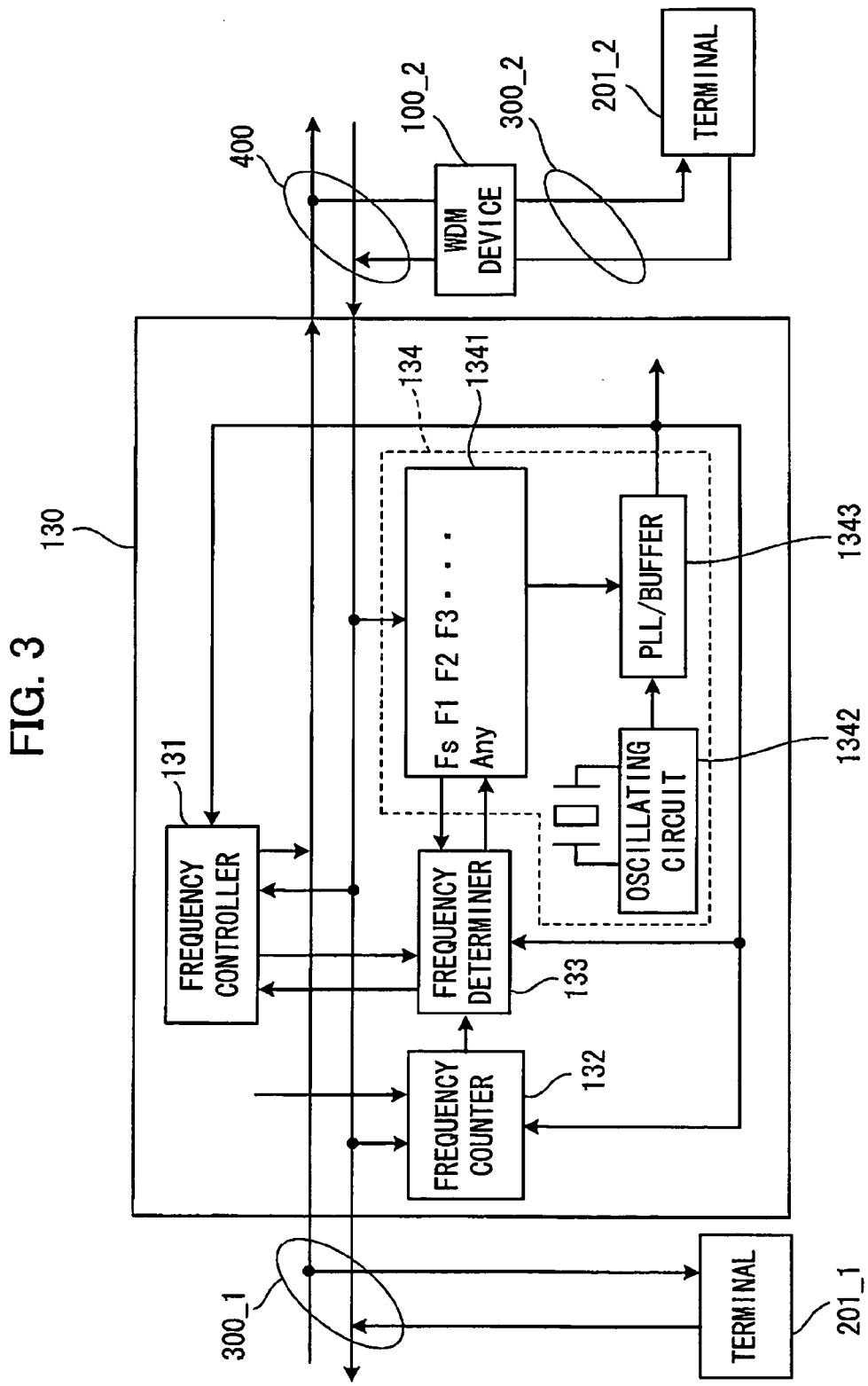
FIG. 3 is a functional block diagram of the oscillating apparatus.

FIG. 3 is a functional block diagram of the oscillating apparatus 130.

In FIG. 3, only the right terminal 201_1 and the left terminal 201_2 are representatively illustrated out of the plural terminals illustrated in FIG. 1.

The oscillating apparatus 130 includes a frequency controller 131 which controls a clock frequency of the entire WDM apparatus 100_1 illustrated in FIG. 2, a frequency counter 132 which detects a carrier frequency of a signal to be transmitted to or to be received from each of the terminals 201_1 and 201_2, a frequency determiner 133 which determines the clock frequency of the WDM apparatus 100_1, and an oscillator 134 which oscillates the clock signal at the clock frequency determined by the frequency determiner 133. Furthermore, the oscillator 134 is provided with a storing section 1341 which stores plural frequencies and designates one of the plural frequencies, an oscillating circuit 1342 which oscillates a signal at a predetermined frequency, and a PLL-buffer 1343 which adjusts a frequency of an oscillation signal oscillated from the oscillating circuit 1342. The frequency controller 131 corresponds to an example of the frequency notifying section according to the present invention, and also corresponds to an example of the determining section; the frequency counter 132 corresponds to an example of the frequency detecting section according to the present invention; and the frequency determiner 133 corresponds to an example of the frequency setting section according to the present invention.

The storing section 1341 stores the plural frequencies in advance, and has a reusable region which may be rewritten many times by a user. Upon designation of a frequency by the frequency determiner 133, the designated frequency is transmitted to the PLL-buffer 1343, and is set as a clock frequency. The storing section 1341 corresponds to an example of the storing section according to the present invention, and also corresponds to the designating section according to the present invention. In addition, the combination of the oscillating circuit 1342 and the PLL-buffer 1343 corresponds to an example of the oscillating section according to the present invention.

Figure 4:
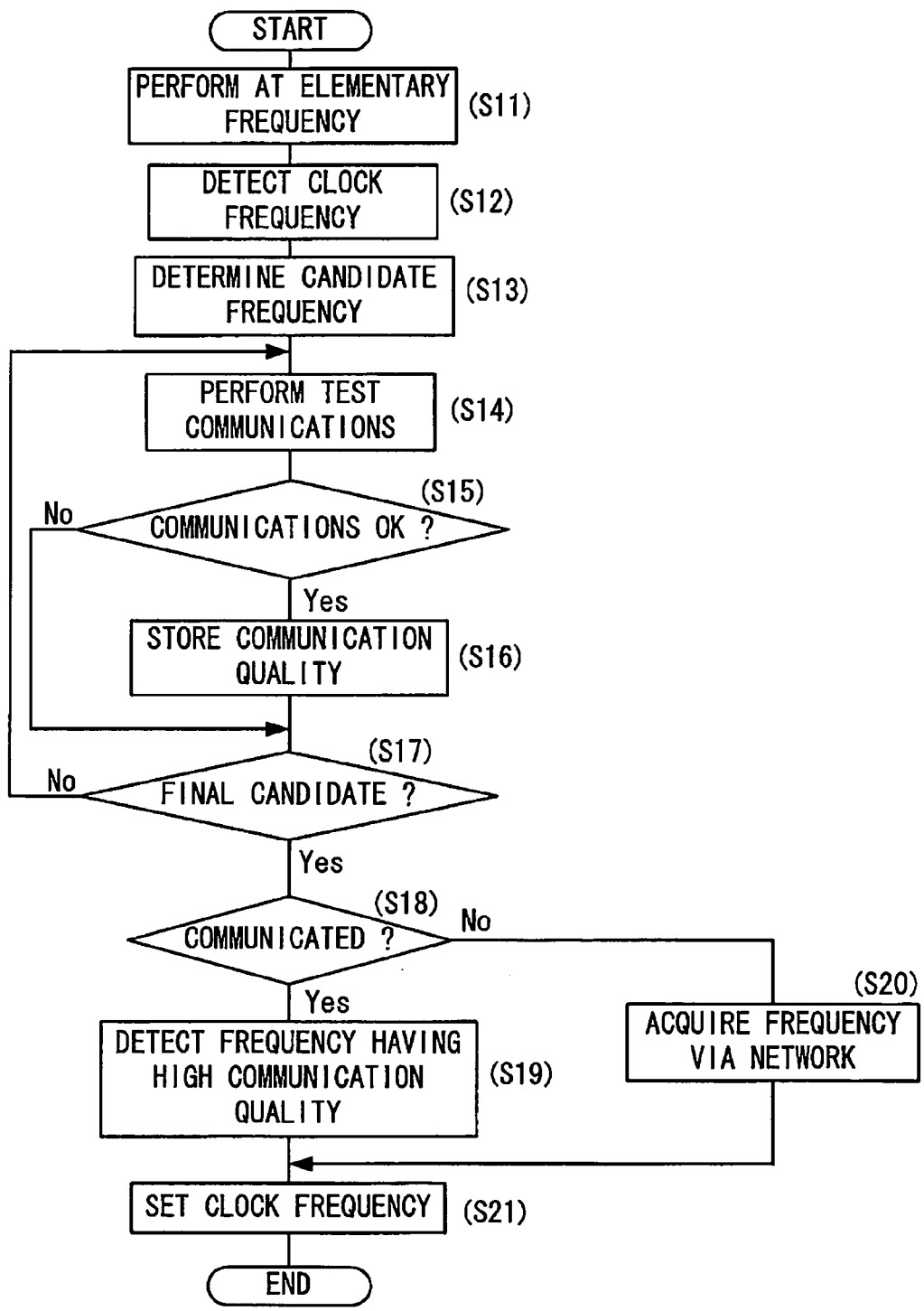
FIG. 4 is a flowchart illustrating a series of processes until the clock frequency is determined.

FIG. 4 is a flowchart illustrating a series of processes until the clock frequency is determined.

The storing section 1341 in advance stores an elementary frequency Fs of a reference signal to be used as a counter in an initial state. In determining the clock frequency, the frequency controller 131 first sends, to the entire WDM apparatus 100_1, an instruction for performing an operation according to the reference signal with the elementary frequency Fs.

When instruction for performance test communications is given, the frequency determiner 133 takes the elementary frequency Fs from the storing section 1341, and designates the elementary frequency Fs as a clock frequency for the storing section 1341.

The elementary frequency Fs designated in the storing section 1341 is transmitted to the PLL-buffer 1343, to be set as the clock frequency. In the PLL-buffer 1343, the frequency of the signal oscillated from the oscillating circuit 1342 is adjusted to the elementary frequency Fs, and the reference signal to be the counter for performing the processes is oscillated. In the various elements of the WDM apparatus 100_1 illustrated in FIG. 2, the processes are performed according to the oscillated reference signal (step S11 in FIG. 4).

A signal transmitted from the terminal 201_1 via the client line 300_1 or a signal transmitted from the terminal 201_2 to the WDM apparatus 100_2 via the client line 300_2 and further transmitted from the WDM apparatus 100_2 via the optical fiber line 400 is received by the frequency controller 131 and the frequency counter 132 in the oscillating apparatus 130 illustrated in FIG. 3 in addition to the optical interface 100 and the optical wavelength division multiplexing separator 120 illustrated in FIG. 2. The frequency counter 132 detects the carrier frequency of the received signal (step S12 in FIG. 4). The detected carrier frequency is transmitted to the frequency determiner 133.

The frequency determiner 133 determines a candidate frequency to be a candidate for the clock frequency out of the plural frequencies stored in the storing section 1341 based on the transmitted carrier frequency (step S13 in FIG. 4). In the present embodiment, first, an integral multiple (1×Fh, 2×Fh, 3×Fh, . . . ) and an integral submultiple (Fh/1, Fh/2, Fh/3, . . . ) of a detected carrier frequency Fh are calculated, and a frequencies which coincides with the calculated frequency is determined as the candidate frequency out of the plural frequencies stored in the storing section 1341. At this time, a slight error is allowable. The determined candidate frequencies are designated as temporary clock frequencies one by one in sequence.

When the candidate frequency is designated as the temporary clock frequency, the clock signal having the designated candidate frequency is output from the PLL-buffer 1343. The various parts in the WDM apparatus 100_1 illustrated in FIG. 2 performs the test communications between the terminals 201_1 and 201_2 according to the oscillated temporary clock signal (step S14 in FIG. 4).

The frequency controller 131 detects transmission and reception errors during the test communications or an error in the transmitted signal, and it is determined whether or not the temporary clock signal is appropriate (step S15 in FIG. 4). If the number of transmission and reception errors or the number of errors of the signal is a predetermined number or less (Yes in step S15 in FIG. 4), it is determined that the temporary clock signal is appropriate, and thus, the number of transmission and reception errors and the number of errors of the signal are stored as a communication quality (step S16 in FIG. 4).

The processes in steps S14 and S15 are repeated up to a final candidate frequency (step S17 in FIG. 4).

If there are candidate frequencies which are determined to be appropriate for the clock frequency (i.e., the communication quality is preserved) (Yes in step S18 in FIG. 4) at the time when the processing up to the final candidate frequency is finished (Yes in step S17 in FIG. 4), one having a highest communication quality out of the candidate frequencies is determined as the clock frequency (step S19 in FIG. 4).

In addition, if there is no candidate frequency which is determined to be appropriate for the clock frequency (i.e., the communication quality is not preserved) (No in step S18 in FIG. 4), the frequency controller 131 transmits a request signal representing a request for designating a frequency to each of the terminals 201_1 and 201_2.

For example, when a user of the terminal 201_2 designates a frequency by using a mouse or the like, a response signal representing a designated frequency is transmitted to the WDM apparatus 100_2 via the client line 300_2, and is transmitted from the WDM apparatus 100_2 to the frequency controller 131 via the optical fiber line 400. The designated frequency acquired in the frequency controller 131 is transmitted to the frequency determiner 133 and is stored in the reusable region in the storing section 1341, and in the frequency determiner 133, the designated frequency is determined as the clock frequency (step S20 in FIG. 4).

The clock frequency such determined as described above is transmitted from the storing section 1341 to the PLL-buffer 1343 to be set as the clock frequency. In the PLL-buffer 1343, a signal oscillated from the oscillating circuit 1342 is output for each of the clock frequencies, so that the clock signal is oscillated (step S21 in FIG. 4).

As described above, according to the present embodiment, the carrier frequencies of the terminals 201_1 and 201_2 connected to the WDM apparatus 100_1 are detected, and the clock frequency is automatically determined based on the carrier frequencies. For this reason, even if the terminal connected to the WDM apparatus 100_1 is changed to other terminal or the WDM apparatus 100_1 is used in another country, it is possible to save time and effort for manually setting the clock frequency by an engineer of a manufacturer and to reduce the cost.

Moreover, according to the present embodiment, if there is no frequency suitable for the clock frequency in the frequencies stored in advance, a frequency may be remotely designated from the terminal connected to the WDM apparatus 100_1.

The explanation of the first embodiment according to the present invention is as described above. Next, a second embodiment will be described below. The second embodiment according to the present invention has the same configuration as that in the first embodiment according to the present invention illustrated in FIGS. 1, 2, and 3 except for a flow of processing of determining a clock frequency. Thus, FIGS. 1, 2, and 3 are also used in explaining the second embodiment according to the present invention, and a description will be given of only a difference from the first embodiment according to the present invention.

Figure 5:
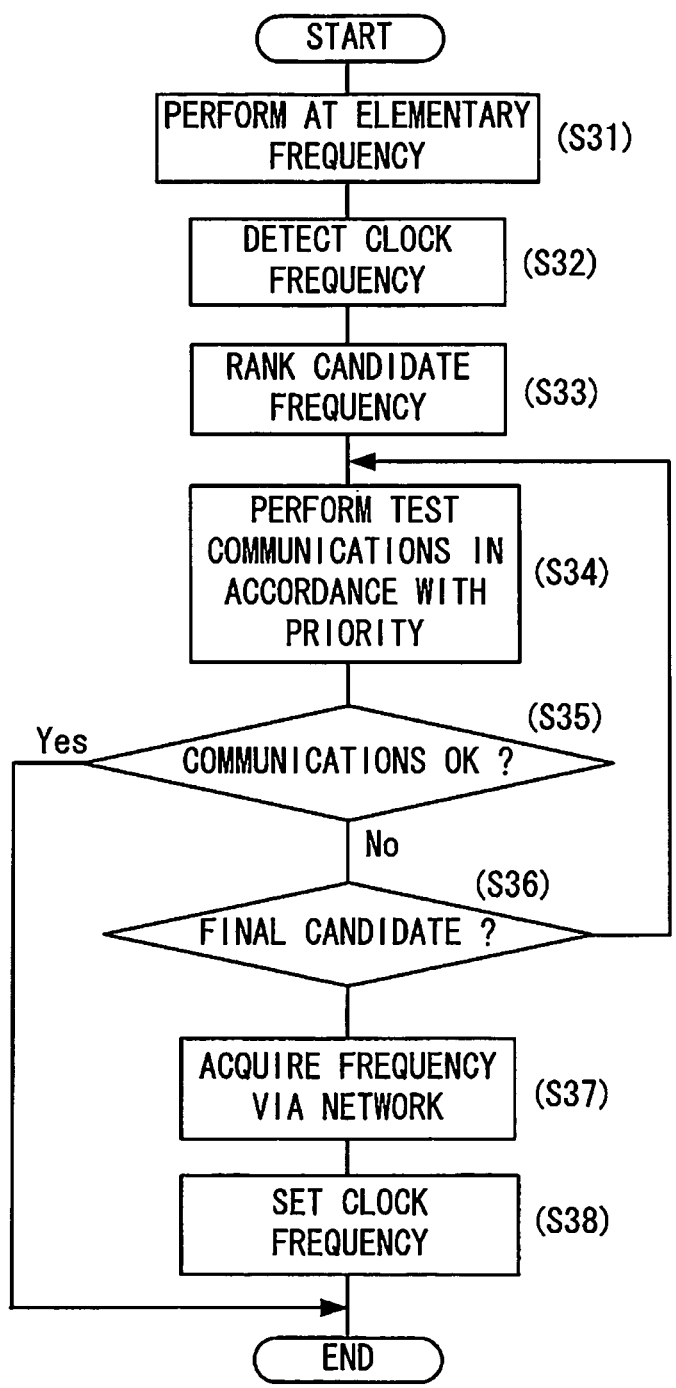
FIG. 5 is a flowchart illustrating a series of processes up to determining of a clock frequency in the second embodiment according to the present invention.

FIG. 5 is a flowchart illustrating a series of processes up to determining of a clock frequency in the second embodiment according to the present invention.

Also in the present embodiment, similar to step S11 in the first embodiment illustrated in FIG. 4, first, an elementary frequency Fs is set as a temporary clock frequency, and then, test communications are performed according to a temporary clock signal (step S31 in FIG. 5).

The frequency counter 132 detects carrier frequencies of signals received from the terminals 201_1 and 201_2 illustrated in FIG. 3 through the test communications (step S32 in FIG. 5).

Similar to step S13 in the first embodiment, the frequency determiner 133 determines a frequency being close by a predetermined extent or more to an integral multiple (1×Fh, 2×Fh, 3×Fh, . . . ) and an integral submultiple (Fh/1, Fh/2, Fh/3, . . . ) of a detected carrier frequency Fh as a candidate frequency out of the plural frequencies stored in the storing section 1341.

In the first embodiment illustrated in FIG. 4, the determined candidate frequencies are designated as temporary clock frequencies one by one, and then, the test communications are performed for all of the candidate frequencies. In contrast, in the present embodiment, the determined candidate frequencies are designated as temporary clock frequencies sequentially in a predetermined priority, and the test communications are performed. The test communications are finished at the time when the communications are succeeded. In the present embodiment, the determined candidate frequencies are designated as the temporary clock frequencies in a decreasing order of frequency (step S33 in FIG. 5).

First, a candidate frequency having a highest priority is designated as the temporary clock frequency, and then, the PLL-buffer 1343 outputs a clock signal having the designated candidate frequency. The various components in the WDM apparatus 100_1 illustrated in FIG. 2 perform the test communications with the terminals 201_1 and 201_2 according to the oscillated temporary clock signal (step S34 in FIG. 5).

The frequency controller 131 detects transmission and/or reception errors during the test communications or an error in the transmitted signal. If the number of transmission and/or reception errors or the number of errors of the signal is a predetermined number or less (Yes in step S35 in FIG. 5), the candidate frequency set at this time is determined as the clock frequency as it is.

In addition, if the number of transmission/reception errors or the number of errors of the signal exceeds the predetermined number (No in step S35 in FIG. 5), the temporary clock signal is determined to be unsuitable, and then, a candidate frequency having a second priority is set as a clock frequency, followed by the test communications (step S34 in FIG. 5).

The candidate frequencies are set as the clock frequencies in sequence in accordance with the priority, and the test communications are performed (step S34 in FIG. 5). This processing is repeated until the number of transmission and/or reception errors or the number of errors of the signal becomes the predetermined number or less (Yes in step S35 in FIG. 5) or the state in which the number of transmission/reception errors or the number of errors of the signal exceeds the predetermined number (No in step S35 in FIG. 5) continues till the last candidate frequency (Yes in step S36 in FIG. 5).

If it is determined with respect to all of the candidate frequencies that the temporary clock signals are not appropriate (Yes in step S36 in FIG. 5), the frequency controller 131 transmits a request signal representing a request for designating a frequency to the terminals 201_1 and 201_2, and then, a user designates a frequency by using the terminals 201_1 and 201_2 (step S37 in FIG. 5).

The clock frequency remotely designated by the user is stored in the reusable region in the storing section 1341, and further, is transmitted from the storing section 1341 to the PLL-buffer 1343 to be set as the clock frequency (step S38 in FIG. 5).

According to the present embodiment, the candidate frequencies are set in sequence as the clock frequencies in accordance with the priority. The candidate frequency which has been set at the time when the communications are established is used as the clock frequency as it is, so that the processing is improved. Moreover, according to the present embodiment, the candidate frequencies are set in sequence in the descending order of frequency as the clock frequencies, and the clock frequency at which high speed communications are obtained may be set quickly.

The descriptions have been given to the example in which the electronic apparatus according to the present invention is applied to the WDM apparatus. However, the electronic apparatus according to the present invention may be a communication relay apparatus and the line other than the WDM apparatus.

In addition, although the example in which the plural candidate frequencies are set as the clock frequencies in sequence in the descending order of frequency is described. However, the frequency setter according to the present invention may set plural candidate frequencies as clock frequencies in a descending order from one closest to a carrier frequency of a signal transmitted from an external apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An electronic apparatus with which an external apparatus is connected and which performs at least one of inputting and outputting a signal to and from the external apparatus, comprising:
　a clock section in which a frequency is set and which gives a clock signal having the set frequency;
　an input-output section which performs an input-output operation including at least one of inputting and outputting the signal according to the clock signal given from the clock section;
　a frequency detecting section which detects a frequency of the signal given from the external apparatus; and
　a frequency setting section which determines the frequency of the clock signal based on the frequency detected by the frequency detecting section, and sets the frequency in the clock section, and
wherein the clock section comprises:
　a storing section which stores a plurality of frequencies and rewritably stores one or more frequencies other than the plurality of frequencies;
　a designating section which one of the frequencies stored in the storing section is designated; and
　an oscillating section which gives a clock signal having the frequency designated in the designating section, and
the electronic apparatus includes a frequency notifying-storing section of which a frequency is notified via a communication line from the external apparatus and which stores the notified frequency in the storing section, wherein the frequency of the frequency notifying-storing section is different from the plurality of frequencies previously stored in the storing section.

2. The electronic apparatus according to claim 1, wherein the frequency detecting section receives a reference clock signal given from the clock section in which a predetermined reference frequency is set, and operates according to the reference clock signal.

3. The electronic apparatus according to claim 1, wherein the frequency setting section finds, out of a plurality of predetermined frequencies, a corresponding frequency which is an integral multiple or an integral submultiple of the frequency detected by the frequency detecting section, and then, determines the corresponding frequency as the frequency of the clock signal to set the frequency in the clock section.

4. The electronic apparatus according to claim 1, wherein the clock section comprises:
　a storing section which stores a plurality of frequencies;
　a designating section in which one of the plurality of frequencies stored in the storing section is designated; and
　an oscillating section which gives a clock signal having the frequency designated in the designating section.

5. The electronic apparatus according to claim 1, wherein the frequency detected is compared with the plurality of predetermined frequencies to determine the corresponding frequency to be designated.

6. The electronic apparatus according to claim 1, wherein the frequency received via the communication line is rewritably stored in the storing section and the frequency received is set as the clock signal.

7. A clock control apparatus that controls a clock signal to be supplied to an electronic apparatus with which an external apparatus is connected, and which performs at least one of inputting and outputting a signal to and from the external apparatus, comprising:
　a frequency detecting section which detects a frequency of the signal given from the external apparatus; and
　a frequency setting section which determines the frequency of the clock signal based on the frequency detected by the frequency detecting section, and sets the determined frequency for a clock which supplies a clock signal of the set frequency to the electronic apparatus, and
wherein the clock comprises:
　a storing section which stores a plurality of frequencies and rewritably stores one or more frequencies other than the plurality of frequencies;

a designating section which one of the frequencies stored in the storing section is designated; and an oscillating section which gives a clock signal having the frequency designated in the designating section, and the clock control apparatus includes a frequency notifying-storing section of which a frequency is notified via a communication line from the external apparatus and which stores the notified frequency in the storing section, wherein the frequency of the frequency notifying-storing section is different from the plurality of frequencies previously stored in the storing section.

\* \* \* \* \*